Figure 1:
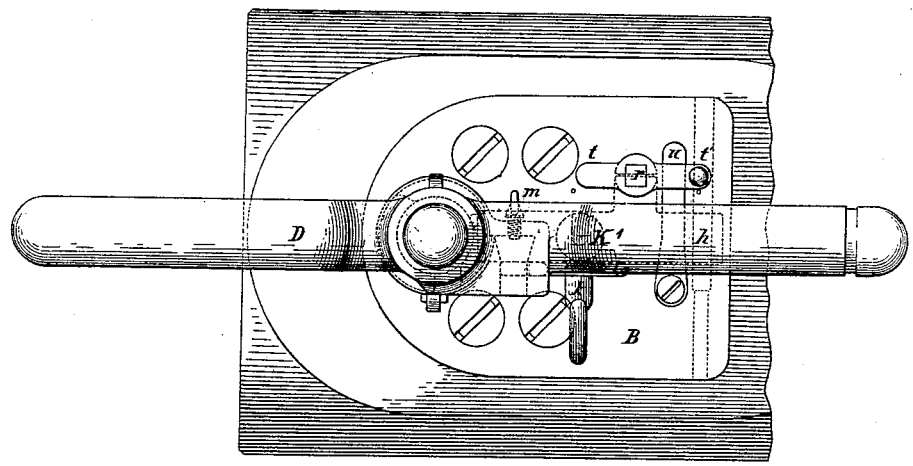

(No Model.)

W. GROSS & C. POHLIT.
BREECH LOADING ORDNANCE.

No. 523,834.

4 Sheets—Sheet 1.

Patented July 31, 1894.

WITNESSES:
Charles Bles.
Marion Hall

Fig. 2ª.

INVENTORS
W. Gross
C. Pohlit
BY
ATTORNEYS.

(No Model.)  W. GROSS & C. POHLIT.  4 Sheets—Sheet 2.
BREECH LOADING ORDNANCE.

No. 523,834.  Patented July 31, 1894.

WITNESSES:  INVENTORS (No Model.) 4 Sheets—Sheet 3.

W. GROSS & C. POHLIT.
BREECH LOADING ORDNANCE.

No. 523,834. Patented July 31, 1894.

WITNESSES:
Chas. Bles.
Marion Hall

INVENTORS
W. Gross.
C. Pohlit.
BY
Goepel & Raegener
ATTORNEYS.

THE NORRIS PETERS CO., PHOTO-LITHO., WASHINGTON, D. C.

(No Model.) 4 Sheets—Sheet 4.
W. GROSS & C. POHLIT.
BREECH LOADING ORDNANCE.
No. 523,834. Patented July 31, 1894.
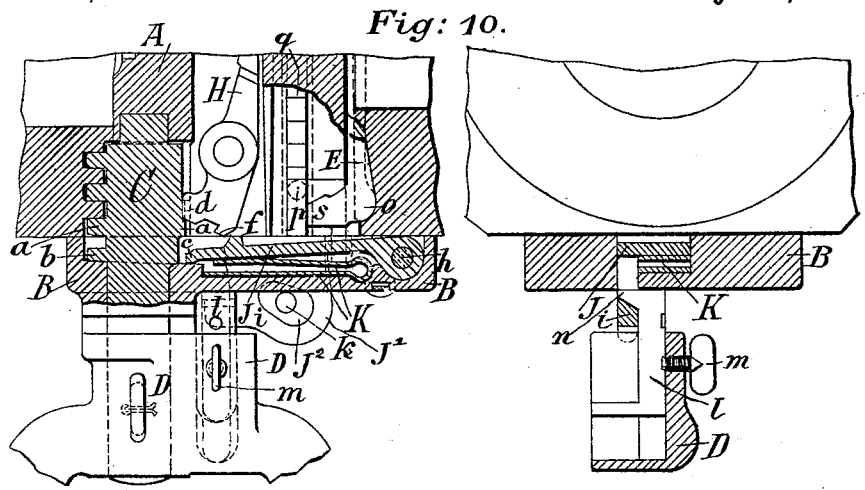
Fig: 10.
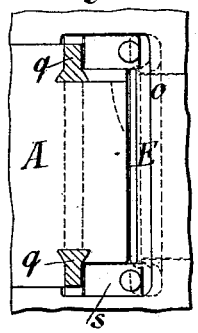
Fig: 11.
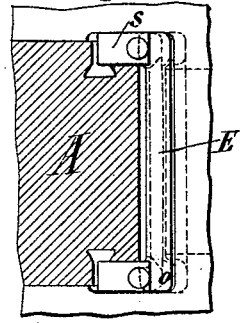
Fig: 12.
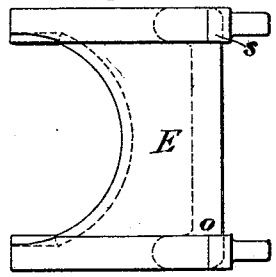
Fig: 13.
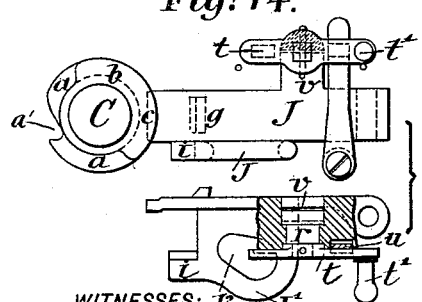
Fig: 14.
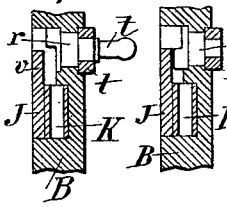
Fig: 15.
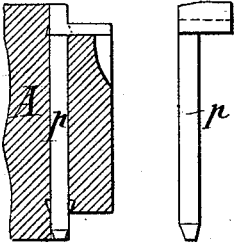
Fig: 16.
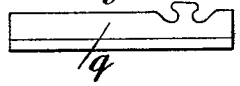
Fig: 17.
WITNESSES:
Carl Kable
Geo. L. Wheelock
INVENTORS
W. Gross & C. Pohlit
BY
ATTORNEYS.
THE NORRIS PETERS CO., PHOTO-LITHO., WASHINGTON, D. C.

UNITED STATES PATENT OFFICE.

WILHELM GROSS, OF WERDEN, AND CARL POHLIT, OF ESSEN, ASSIGNORS TO THE FIRM OF FREDERICK KRUPP, OF ESSEN, GERMANY.

BREECH-LOADING ORDNANCE.

SPECIFICATION forming part of Letters Patent No. 523,834, dated July 31, 1894.

Application filed February 24, 1890. Serial No. 341,384. (No model.) Patented in Germany November 9, 1889, No. 53,080; in Norway December 5, 1889, No. 1,671; in Sweden December 5, 1889, No. 2,721; in France December 5, 1889, No. 202,420; in Switzerland December 5, 1889, No. 1,748; in Belgium December 5, 1889, No. 88,740; in England December 5, 1889, No. 19,563; in Italy December 31, 1889, XXIII, 26,603, CCCCXI, 238; in Spain February 4, 1890, No. 10,302; in Portugal February 13, 1890, No. 1,429, and in Austria-Hungary April 7, 1890, No. 52,635 and No. 10,586.

*To all whom it may concern:*

Be it known that we, WILHELM GROSS, residing at Werden, and CARL POHLIT, residing at Essen-on-the-Ruhr, Prussia, Germany, subjects of the King of Prussia, have invented new and useful Improvements in Breech-Loading Ordnance, (for which patents have been obtained in the following countries, to wit: Germany, No. 53,080, dated November 9, 1889; Portugal, No. 1,429, dated February 13, 1890; Spain, No. 10,302, dated February 4, 1890; Norway, No. 1,671, dated December 5, 1889; Sweden, No. 2,721, dated December 5, 1889; France, No. 202,420, dated December 5, 1889; Austria-Hungary, No. 52,635 Tom. XL, fol. 1,144, and No. 10,586, Tom. XXIV, fol. 10,231, dated April 7, 1890; Switzerland, No. 1,748, dated December 5, 1889; Italy, No. Reg. Gen., Vol. XXIII, No. 26,603, Reg. Att., Vol. CCCCXI, No. 238, dated December 31, 1889; Belgium, No. 88,740, dated December 5, 1889, and England, No. 19,563, dated December 5, 1889,) of which the following is a specification.

This invention refers to a horizontal closure for the breech of ordnance in which the cocking of the striker is effected by means of a lever upon the opening of the breech through the revolution of the breech-block screw and in which the gun can be fired only after the breech is completely closed. The breech is moreover provided with a new trigger and a device for automatically discharging the gun upon the closing of the breech and with a readily dismountable extractor and a safety device adapted to the construction.

The invention will be best understood by describing the same with reference to the accompanying drawings, in which—

Figure 2:
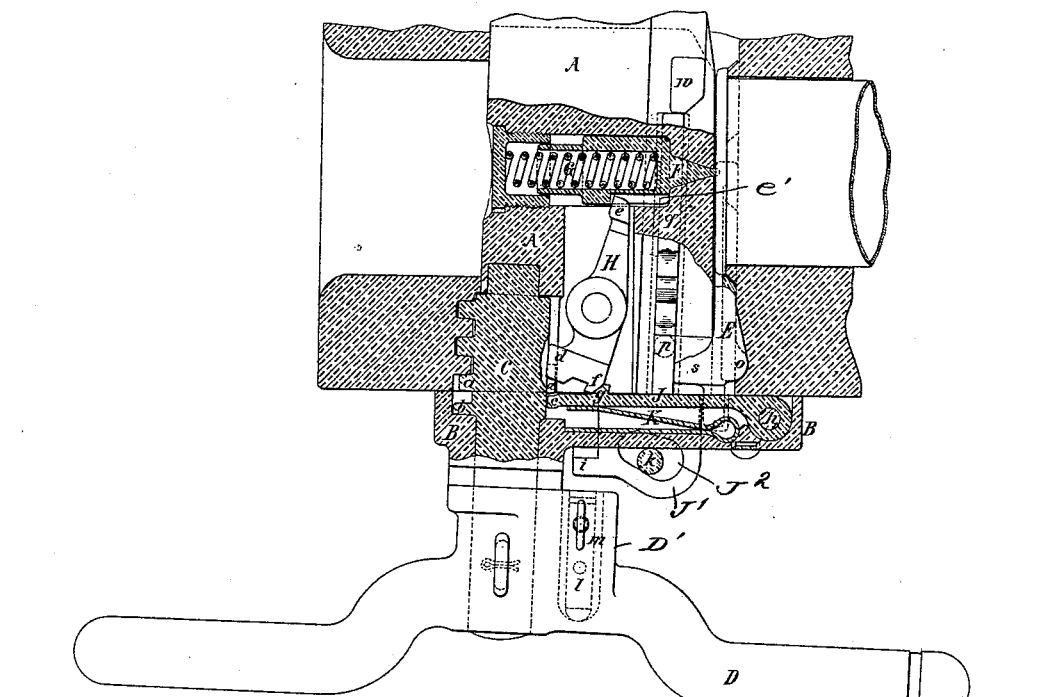
Figure 2:
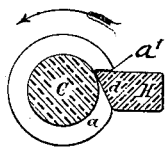
Figure 3:
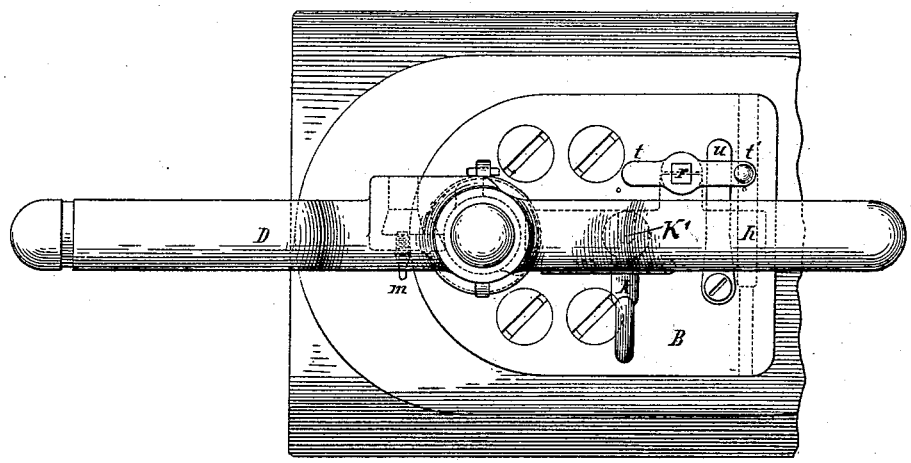
Figure 4:
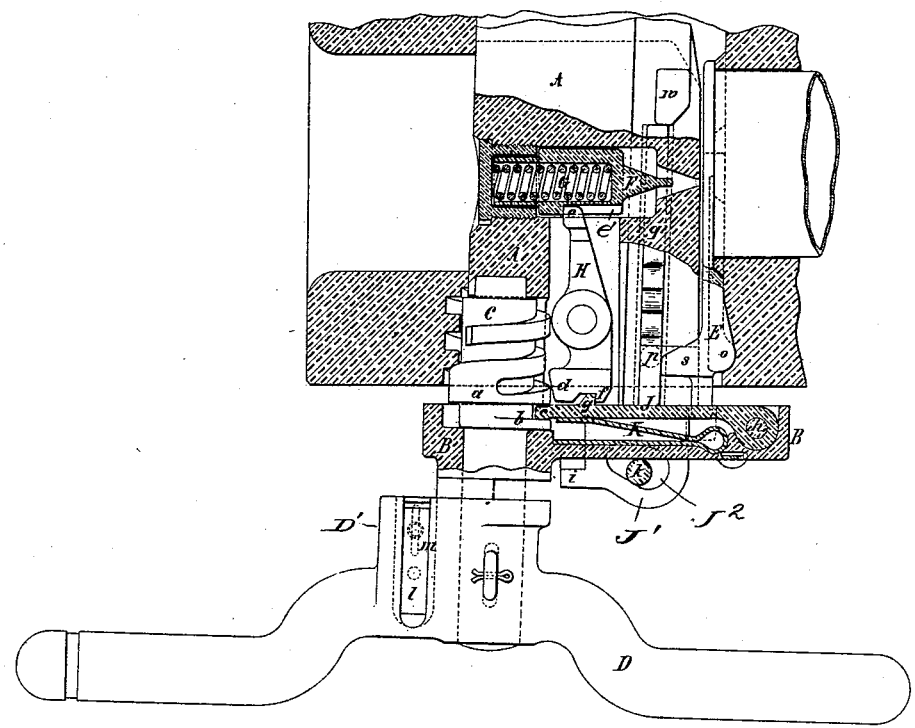
Figure 5:
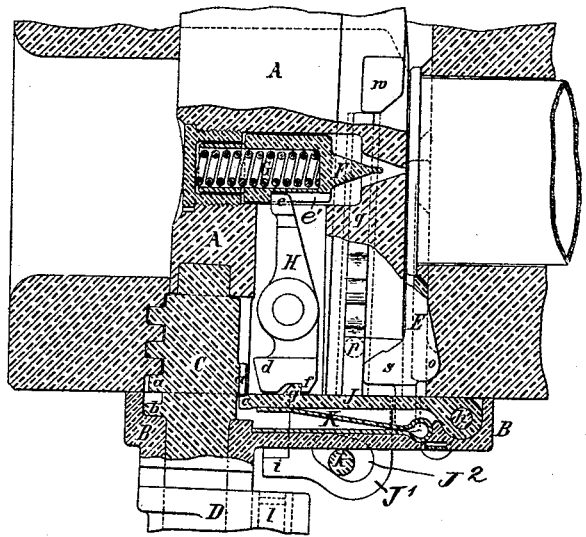
Figure 6:
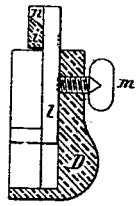
Figure 7:
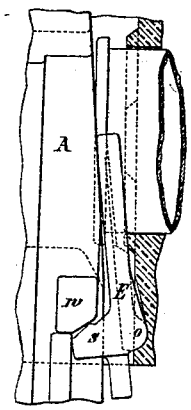
Figure 8:
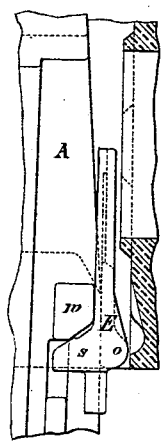
Figure 9:
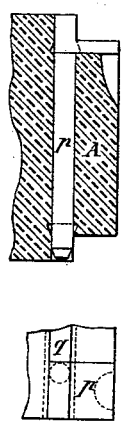

Figure 1 is an outer end view of the breech-block in the gun, the gun being loaded ready for firing. Fig. 2 is a horizontal sectional view through the breech-block, the gun having just been discharged. Fig. 2ª is a detail sectional view through the screw and cocking-lever. Fig. 3 is an end view of the breech-block in opened position. Fig. 4 is a horizontal sectional view through the breech-block, showing how the screw sets the cocking-lever. Fig. 5 is a similar view showing the gun ready for the discharge. Fig. 6 is a detail sectional view through the automatic firing attachment on the screw-handle. Figs. 7 and 8 are horizontal sectional views showing the extractor and how it is operated. Fig. 9 is a vertical longitudinal sectional view through the front part of the breech-block, and a plan view showing the removable guides for the extractor and the pin for holding said guides in place. Fig. 10 is as to its left-hand portion a similar section to Fig. 2, with parts removed, the nose of the slide carried by the handle being shown as engaged with the nose on the sear, whereby the automatic discharge of the gun is effected. The right-hand portion of said figure is a partial section taken at right-angles to its left-hand portion. Figs. 11 and 12 are broken vertical sections taken across the forward portion of the breech-block, and showing the ejector, and the slides received by the dovetail grooves located in both the upper and lower portions of the breech-block. Fig. 13 is a detached plan-view of the ejector. Fig. 14 is as to its upper portion a face view of the sear and an end view of the screw, showing their relation to each other and also the arrangement of the safety device in relation to the trigger; as to its lower portion, said figure shows a longitudinal section through the safety-device and trigger. Fig. 15 shows two vertical transverse sectional views through the safety-device and trigger, showing the former in different positions. Figs. 16 and 17 are views showing respectively the pin for the slides in the breech-block, and also one of said slides.

Similar letters of reference indicate like parts in all the figures.

The closure for the breech of the improved ordnance comprises the breech-block or wedge A, the cover or locking plate B secured thereto and provided with suitable recesses, the breech-block screw C provided with the locking handle D and the necessary locking and safety devices.

The breech-block screw C, which is supported with one end in the breech-block A and with its crank-pin in the cover plate B, has in its outer stronger full thread $a$ a notch $a'$ of triangular shape, see Figs. $2^a$, 10 and 14. In front of the thread is a collar $b$ which on the right side (when the breech is closed) is partly cut away. (See Figs. 2, 5 and 10.)

The cocking-lever H has two arms, the left arm is formed with a nose $e$ which takes into a groove $e'$ in a striker F and presses the latter back for cocking the striker spring G. The right arm of the cocking-lever H is at its rear portion (with respect to the axis of the tube) formed with a projection $d$ and at its front portion with a nose $f$.

The sear J (see Figs. 2, 4, 5 and 10) is jointed on the pin $h$: it has an extension or lug $J'$ at right-angles thereto, which projects outward through the cover-plate B and is provided at its rear end with a nose $i$. There is an oval slot $J^2$ formed in the lug having its major axis at an angle with the side of the cover-plate. Passing through the oval slot there is a discharging-bar $k$ which is pivoted on a pin $k'$.

When the piece of ordnance has been discharged (Fig. 2) the action of the cocking-mechanism, safety-appliance and discharging-mechanism is as follows:—On opening the breech, that is to say, on turning the handle D toward the left, the inclined surface forming one wall of the triangular notch $a'$ in the outer thread $a$ of the breech-block screw moves along the inclined surface of the projection $d$ of the cocking-lever H (see Fig. 2) and forces its right arm forward to such an extent that the nose $f$ passes behind the nose $g$ on the sear J. At the same time the nose $e$ of the left arm of the cocking-lever bears against the closed end of the groove $e'$ in the striker F and forces the latter backward, whereby the striker spring G is cocked. The spring K forces the sear J constantly against the cocking-lever H so that the parts will automatically set. During the revolution of the handle, after the projection $f$ has passed behind the projection $g$, the segmental collar $b$ of the breech-block screw comes into position behind the end $c$ of the sear (see Figs. 4 and 5) and prevents accidental discharge so long as the breech is open. On turning the handle to the right again, that is to say, on closing the breech, the end $c$ in the last moment of the closing is disengaged again and the gun can be fired. By pressing or pulling the firing-bar $k$ backward, the round portion of the same forces the sear J to the right by acting on the edge of the inclined oval slot $J^2$ in the lug $J'$, the cocking-lever H is set free, and the striker F is forced forward by the action of the striker spring against the priming of the cartridge. The left arm of the cocking-lever is engaged by the striker and the right arm is pressed backward, while the projection $d$ engages again into the notch or recess $a'$ of the thread $a$, as illustrated in Fig. 2.

The appliance for automatically discharging the piece of ordnance (see Figs. 1, 2, 3, 4, 6 and 10) consists of a slide $l$, which is disposed in a dovetail groove in a lateral extension $D'$ on the lower side (when in a closed condition) of the handle D and which is fixed in any required position in said groove by means of a thumb-screw $m$, Figs. 6 and 10. On the end of the slide $l$ toward the tube there is a downwardly projecting beveled nose $n$. To automatically effect the discharge, the handle D is turned a little around toward the left and the gunner or operator draws the slide $l$ so far out of the groove that its nose $n$ strikes or comes near to the cover plate B and he then fixes the said slide in position by means of the thumb-screw $m$. When thus set, if the gunner thereupon turns the handle round toward the right, that is to say if he completely closes the breech, the nose $n$ of the slide will come before the beveled nose $i$ of the sear and press the latter outward, consequently disengaging the projection $g$ from the nose $f$ of the cocking-lever and thereby setting the striker free.

The extractor E is so constructed, that it may be taken out of the breech without the aid of special appliances and for this purpose slides $q$, $q$, are provided which are located in dovetail-grooves on both the upper and under surfaces of the breech-block and can slide toward the cover-plate B and these slides are secured in position by a pin $p$ inserted vertically from above (see Figs. 2, 3, 4, 5, 9, 11, 12 and 16).

Upon the backward and forward movements of the breech-block A the noses $s$ $s$ of the extractor E move along the slides $q$ $q$ and the extractor is thus securely retained in its position in the gun.

When it is wished to move the extractor from the gun or from the breech-block, the latter is opened and drawn so far out of the breech that the catches $w$ touch the noses $s$ $s$ of the extractor E. The operator then draws out the pin $p$, pushes the upper and lower slides against the cover-plate B and presses the extractor against the front of the breech-block. The extractor then enters with its noses $s$ $s$ in the spaces produced by the withdrawal of the slides in the block and allows the whole extractor with its bulged part $o$ to pass out of the gun, and the breech-block with the extractor can be drawn out of the breech and the extractor lifted off from the block.

A safety-device (Figs. 1, 14 and 15) has for its purpose to prevent the discharge of the loaded piece of ordnance. The safety-appliance consists of a cylindrical shaft $r$ supported in the cover-plate and having the outer end formed square. To the shaft is secured a lever $t$ with a small handle $t'$ retained in position by the spring $u$ suitably fastened to the cover-plate. The under half of the cylinder is cut away so that when the breech is secured the projection $v$ upon the front of the sear J can pass at the discharge under the half cylinder (see left-hand part of Fig. 15). But by turning the handle of the lever through one hundred and eighty degrees so that it is turned toward the bottom of the gun the half cylindrical part of the safety-device comes before the projection $v$ of the sear preventing said sear from being compressed against its spring and thereby preventing the projection $g$ from being removed from the projection $f$ of the striker H, and therefore the gun cannot be discharged, see right-hand part of Fig. 15.

Having now fully described and ascertained the nature of our invention and in what manner the same is to be performed, we declare that what we claim is—

1. In a breech loading ordnance, the combination of a sliding breech-block, an operating screw therefor provided with a peripheral cam-shaped recess in its thread, a sliding spring-actuated striker, a cocking lever engaging said striker at one end and engaged by the cam on said recessed thread at the other end, and a sear having a nose for engaging said cocking lever, substantially as described.

2. In a breech loading ordnance, the combination of a sear, a sliding breech block, an operating screw therefor provided with a recessed collar engaging said sear, a sliding spring actuated striker, and a cocking lever for engaging said striker operated by said screw, substantially as described.

3. In a breech loading ordnance, the combination of a striker, a cocking lever for cocking said striker, a hinged sear provided with an inward projection, and with an exterior lug having an inclined oval slot, a spring for pressing said sear against said lever and retaining the latter in position, and a pull-bar passing through said slot, substantially as set forth.

4. In a breech loading ordnance, the combination with the sliding breech block bearing the striker and the trigger mechanism, and the breech operating screw, of an automatic releasing or firing mechanism, comprising the breech block screw handle, a slide disposed in a groove thereof and provided with a nose adjustable to engage and release the trigger mechanism when said screw is turned home, and also adjustable out of operative connection with said trigger mechanism, substantially as described.

5. In a breech loading ordnance, the combination of a horizontally sliding breech block, provided with recesses on its upper and lower sides and with cams at the inner ends of said recesses, slides disposed in said recesses, and an extractor held in position on the breech of the gun by said slides, and adapted to be engaged by said cams, substantially as described.

6. In a breech loading ordnance, the combination of a breech block, a sear having a projection $v$, a cover plate, and a shaft $r$ having a projection adapted to engage said projection on the sear, a striker and a cocking lever for cocking said striker, substantially as described.

In testimony whereof we have signed our names to this specification in the presence of two subscribing witnesses.

WILHELM GROSS.
CARL POHLIT.

Witnesses:
FRITZ MOELLENHOPH,
HERMANN KUHFUS.